Patented June 30, 1936

2,045,850

UNITED STATES PATENT OFFICE 2,045,850

METHOD FOR IMPROVING AND REFINING VICTUALS AND TABLE-LUXURIES CONTAINING CELLULOSE

Viktor Grafe, Vienna, Austria

No Drawing. Application April 7, 1933, Serial No. 665,044. In Austria April 14, 1932

6 Claims. (Cl. 99—74)

The invention relates to a method for improving and refining victuals and table-luxuries the main constituent of which is cellulose.

The invention makes use of the discovery that not only nutritive but also gustatory substances have a greater value if the enclosing cell-walls or membranes are broken up, worn off or destroyed or in other words subjected to disaggregation and dissolution. The invention, further, is based on the discovery that also gustatory qualities of various substances which are not appreciated per se, can be made easily accessible for the papillae of the tongue by suitable fine distribution. According to the invention the process for improving and refining of victuals and table-luxuries containing cellulose, in particular coffee and its surrogates and additions, such as figs, grains, cichory, malt, grape-stones, sugar-beets, acorns, lupines, date-kernels, asparagus-seeds, earth-nuts, beans, and the like; consists in bringing these substances into a colloidal form or into a form of fine distribution approaching the colloidal state by mechanical means, such as grinding by colloid mills and the like, or more suitably by colloid-chemical means or by both.

Of the colloid-chemical means which are effective for the process according to the invention, all means are to be considered which change the colloid-chemical or colloidal character of the product or are capable of causing a colloidal distribution of the product or a distribution thereof approaching the colloidal state, such as employment of dispersing substances, for example electrolytes, peptization etc., said means being employed singly or in combination. By being normally ground on an ordinary mill the victuals or table luxuries are obtained in fine distribution and with a greatly increased surface, which is of very great importance for their nutritive as well as for their gustatory qualities. By adding to said substances while grinding small quantities of dispersing agents, such as alkali phosphates or other alkalies or alkaline acting substances which are permissible according to the sanitary laws a very fine distribution of the product is obtained. But it is also advantageous for the grinding on colloid-mills to use dispersing-substances.

The process according to the present invention, can be carried out in such a manner that the substances in question are first burst open, preferably by subjecting them to a swelling or loosening of the cell-structure while preserving the substances contained in the cell, and then subjecting them in the opened, swelled or loosened state to mechanical or colloido-chemical means in order to bring them into a form at least approaching the colloidal state. This opening, swelling or loosening of the cell-structure can be effected, for example, by a treatment with water-vapour, alkalies, alkaline acting salts, or in any other way. The opening or swelling, however, can also be effected by means of the colloido-chemical measures or by the assistance thereof, for example, by the employment of such substances which act as opening means as well as dispersing means for the transformation into the colloidal state such, as alkali-phosphates and the like.

The fine distribution according to the invention has also the advantage that the treated products with or without the addition of binding means, sugar, condensed or dry milk or other additions influencing the taste or the binding can be shaped for example, into the form of tablets, pills, balls, cubes, sticks, flakes, and the like, which, on being introduced into hot or cold liquids, will instantly produce beverages ready for consumption with all the advantages due to the improvement and refinement of the products effected by the process according to the present invention.

The opening or swelling of victuals and table-luxuries which are subjected to a roasting process can be effected either before, during or after the roasting, but preferably before the roasting. With such roasted victuals or table-luxuries an improvement of the taste and a greater wholesomeness of the roasted products can be obtained according to the invention by chemically binding the sour products produced during the roasting. This means no lixiviation of the starting materials, but a binding of the sour products or bitter principles produced during roasting and containing essentially aldehydes and ketones. This binding is effected by addition of alkaline acting salts and the like, while preserving the substances contained in the cell; whereby, due to the addition of the alkaline acting salts the additional advantage is obtained that the roasting temperature can be considerably reduced.

As alkaline acting salts and the like for the binding of the products produced during the roasting, come into consideration for example, alkali-phosphates, alkali-carbonates, alkali-sulfites, and alkali-salts of organic acids, such as tartrates, citrates, acetates, benzoates and the like. In carrying out the invention, solutions of these substances are applied to the material to be refined before the roasting, for example by sprinkling, and in sufficient quantities, to bind the sour products produced during the roasting.

Due to the present process an extraction of the victuals and table-luxuries can also be avoided, whereby are obtained, without the necessity of extracting, effects which surpass the effects obtained with the usual extracts.

The process according to the invention offers also a means to make products useful as valuable articles of food or table-luxuries, which hitherto could not be used as such or have been of very little value.

*Example 1*

10 kg. of malt are subjected for a short period to heating up to about 30° C. while adding 30 gr. of secondary sodium phosphate and 10 gr. of colloidal silicic acid. After the evaporation of the water in vacuo, the material is finely ground either on a fast-running crossbeat-mill or colloplex-mill, or else without evaporation ground in wet state on a colloid-mill. The diastase effect is thereby augmented three to five times, as has been proved by trials.

*Example 2*

100 kg. of pre-dried cichory, figs or malt, are soaked in order to be opened, with about 40 liters of a 10% alkali-carbonate solution and left at ordinary temperature until most of the liquid has been absorbed, whereupon the remaining quantity of liquid is poured off or decanted. The stronger the solution employed is, the smaller is the amount absorbed so that the quantity of liquid used can be graduated accordingly. In order to preserve the substances contained in the cell the subsequent roasting process has to be carried out without pressure and for a period of not more than 15 minutes, when not only a physical destruction of the constituents of the cell-wall takes place by loosening the structure, but also a chemical decomposition of the cellulose-molecules.

The most important feature consists in the addition of a dispergator which not only mitigates the destruction in the chemical direction, but also renders possible the grinding of the product up to the desired fineness more particularly the later grinding. As such dispergator secondary sodium phosphate has proved the best. To the alkali-salt solution used for the opening or swelling of the cells is added a 10% sodium-phosphate solution or colloidal silicic acid in the amount of 2% of the dry, raw product used. After the roasting under normal pressure the roasting product is ground by crossbeat-mills or colloplex-mills which are in connection with shaking sieves or wind-sifters. Under the microscope no cells which remained intact are seen, the substances contained in the cell are laid open and changed by the roasting in such a manner that new taste and gustatory qualities present themselves which before have not been perceived since the taste papillae could not come into relation with the substances contained in the cell-wall or membrane.

By the treatment with alkalies or alkaline acting salts is also obtained the advantage that soluble alkali-albuminates as well as soluble phosphatides are formed. Moreover, by the alkalies or alkaline acting salts the cystin which, for instance, in legumens is contained in great quantities, is segregated or eliminated whereby the percentage of other amino-acids and, thereby, also the nutritive value is considerably raised.

*Example 3*

100 kg. of pre-dried fig, cichory, malt and other coffee-surrogates are mixed with about 20 liters of a mixture of 1 kg. secondary sodium-biphosphate, 0.5 kg. sodium-carbonate, or a mixture of sodium-carbonate and bicarbonate of equal parts and 0.5 kg. sodium-bisulfite in lukewarm state and then left in contact therewith for a period of not over 15 minutes, whereupon the liquid is filtered away or better drawn off. The mixture must be conditioned in accordance with the raw material used so that in the roasted state no trace of sodium-bisulfite is detectable. Said salt serves for binding the aldehydes, ketones and aldehyde- and ketone-acids produced during the roasting, which are the most disagreeable roasting products. Experience has shown that, if this prescription is observed, not more is taken up than is required for this binding, viz not more than ¼ to ½ per thousand. The subsequent roasting requires no higher temperature than 150° C., at which temperature the aldehyde-sulfites and the like formed are stable. In the extract of 500 gr. of a so treated coffee-surrogate, hardly detectable traces of the above-mentioned compounds are present.

By grinding, preferably in the presence of dispersing substances, such as alkali-phosphates and the like, the product can be brought into a finely distributed form, at least approaching the colloidal state.

What I claim is:

1. Method for improving and refining victuals and table-luxuries, the main constituent of which is cellulose, and more particularly coffee and its surrogates and additions, such as figs, grains, chicory, malt, grape-stones, sugar-beets, acorns, lupines, date-kernels, asparagus-seeds, earth-nuts, beans, and the like, which method consists in adding dispersing substances to the starting materials and bringing said substances and material into a form of fine distribution approaching the colloidal state, said dispersing substances, permissible within the sanitary laws, being selected from a group consisting of alkalies, alkali phosphates and earth-alkali-phosphates.

2. Method according to claim 1, in which said materials to be improved are being ground while adding said dispersing substances.

3. Method according to claim 1, in which said materials to be improved are subjected to bursting before they are transformed into the form approaching the colloidal state.

4. Method according to claim 1, in which said materials to be improved before being transformed into the form approaching the colloidal state are subjected to disaggregation and dissolution into such elements which are capable of being resorbed by the body.

5. Method according to claim 1 in which said materials to be improved are first subjected to disaggregation by substances capable of acting as dispersing agents and thereafter are brought into a form of fine distribution approaching the colloidal state by further addition of small amounts of said substances.

6. Method according to claim 1 in which said materials to be improved are subjected to a roasting process, the sour products produced during the roasting being chemically bound by adding alkaline acting salts in amounts sufficient for binding said sour products.

VIKTOR GRAFE.